(12) United States Patent
Yang et al.

(10) Patent No.: US 11,205,823 B2
(45) Date of Patent: Dec. 21, 2021

(54) CERAMIC SEPARATOR

(71) Applicants: PROLOGIUM TECHNOLOGY CO., LTD., Taoyuan (TW); Prologium Holding Inc., Grand Cayman (KY)

(72) Inventors: Szu-Nan Yang, Taoyuan (TW); Dmitry Belov, Taoyuan (TW)

(73) Assignees: PROLOGIUM TECHNOLOGY CO., LTD., Taoyuan (TW); PROLOGIUM HOLDING INC., Grand Cayman (KY)

( * ) Notice: Subject to any disclaimer, the term of this patent is extended or adjusted under 35 U.S.C. 154(b) by 0 days.

(21) Appl. No.: 17/039,099

(22) Filed: Sep. 30, 2020

(65) Prior Publication Data

US 2021/0119194 A1 Apr. 22, 2021

(30) Foreign Application Priority Data

Oct. 22, 2019 (TW) .................................. 108138055

(51) Int. Cl.
*H01M 50/446* (2021.01)
(52) U.S. Cl.
CPC ................................. *H01M 50/446* (2021.01)
(58) Field of Classification Search
CPC .................................................. H01M 50/443
See application file for complete search history.

(56) References Cited

U.S. PATENT DOCUMENTS

| 5,523,181 | A | * | 6/1996 | Stonehart | ............ | H01M 8/1023 |
| | | | | | | 429/314 |
| 2010/0239918 | A1 | * | 9/2010 | Pratt | .................. | H01M 10/056 |
| | | | | | | 429/307 |
| 2015/0050541 | A1 | * | 2/2015 | Kinoshita | ........... | H01M 10/052 |
| | | | | | | 429/144 |
| 2016/0149261 | A1 | * | 5/2016 | Zaghib | ................. | H01M 4/382 |
| | | | | | | 429/94 |
| 2017/0092915 | A1 | * | 3/2017 | Ku | .................... | H01M 10/0525 |
| 2018/0375148 | A1 | | 12/2018 | Yersak et al. | | |
| 2019/0198837 | A1 | | 6/2019 | Yushin et al. | | |

FOREIGN PATENT DOCUMENTS

| CN | 107452928 A | 12/2017 |
| CN | 109119683 A | 1/2019 |
| WO | 2019/200073 A1 | 10/2019 |

* cited by examiner

*Primary Examiner* — Anca Eoff
(74) *Attorney, Agent, or Firm* — Rabin & Berdo, P.C.

(57) ABSTRACT

The invention provides a ceramic separator, which mainly includes a plurality of passive ceramic particles and an ion-conductive material located between the passive ceramic particles. The mass content of the passive ceramic particles is greater than 40% of the total mass of the ceramic separator. The ion-conductive material is mainly composed of a polymer base material which is capable of allowing metal ions to move inside the material, and an additive, which is capable of dissociating metal salts and is served as a plasticizer. The ceramic separator of the present invention has high-temperature stability and high-temperature electrical insulation.

23 Claims, 9 Drawing Sheets

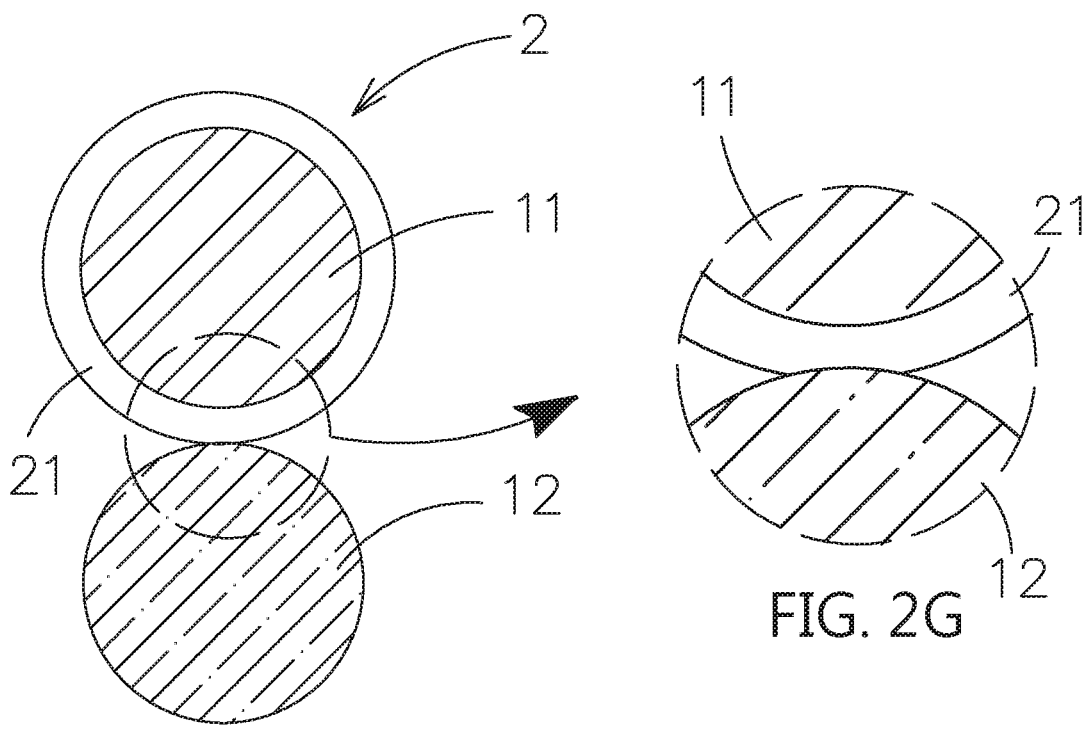
FIG. 2A
FIG. 2G
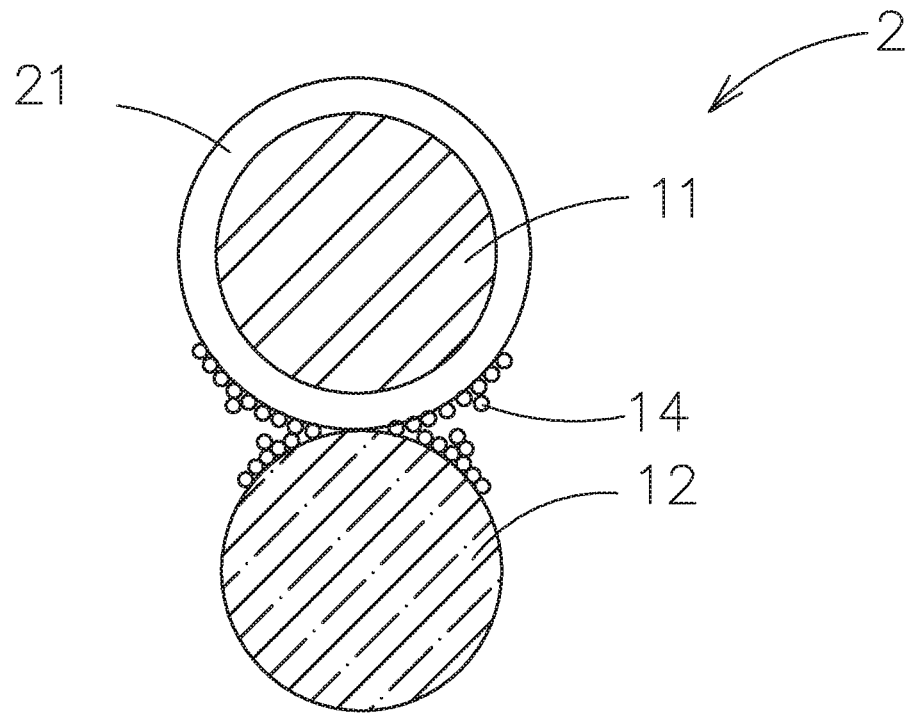
FIG. 2B

CERAMIC SEPARATOR

CROSS REFERENCES TO RELATED APPLICATIONS

The present application claims priority to Taiwanese Patent Application 108138055 filed in the Taiwanese Patent Office on Oct. 22, 2019, the entire contents of which is being incorporated herein by reference.

FIELD OF INVENTION

The present invention relates to a separator of an electrochemical system, in particular to a ceramic separator.

RELATED ART

In the era of energy crisis and energy revolution, secondary chemical energy plays a very important role, especially metal ion batteries with high specific energy and specific power, such as sodium-ion batteries, aluminum-ion batteries, magnesium-ion batteries or lithium-ion batteries. These batteries are applied in information and consumer electronics products, and has recently expanded to the field of transportation energy.

In the conventional metal ion batteries, the most common way to prevent physical contact between the positive electrode and the negative electrode is to use a separator. Excepting for the separation requirement, it is another important requirement for the separator to have certain ionic conductivity to permit ions to pass freely for performing electrochemical reactions. Therefore, the choice of the separator plays an important role in the energy density, the power density, the cycle efficiency and the safety of the batteries. In addition, the separator must have chemical and electrochemical stability for the electrolyte or electrode materials, and must have a certain mechanical strength and high temperature endurance to effectively separate the positive electrode and the negative electrode when the battery is punctured or softened at high temperature. For example, the polypropylene microporous membranes are currently commonly used in primary lithium batteries, and the polypropylene and polyethylene microporous membranes are currently commonly used in secondary lithium batteries. However, the electrical insulation of the separator composed of these polymer materials is not excellent when a puncture occurs or operating at high temperature. Therefore, the use of a polymer separator is not appropriate for the batteries with high-power output and relatively high-temperature operating environments.

Therefore, the invention provides a ceramic separator to meet the above requirements.

SUMMARY OF THE INVENTION

It is an objective of this invention to provide a ceramic separator, mainly including a plurality of passive ceramic particles. An ion-conductive material is located between the passive ceramic particles to achieve high-temperature stability and high-temperature electrical insulation.

In order to implement the abovementioned, this invention discloses a ceramic separator, which mainly includes a plurality of passive ceramic particles and an ion-conductive material located between the passive ceramic particles. The mass content of the passive ceramic particles is greater than 40% of the total mass of the ceramic separator. The ion-conductive material is mainly composed of a polymer base material which is capable of allowing metal ions to move inside the material, an additive, which is capable of dissociating metal salts and is served as a plasticizer, and an ion supplying material.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein:

FIGS. 2A-2F are schematic diagrams of the embodiments of the passive ceramic particles and the ion-conductive material of the ceramic separator according this invention.

FIG. 2G is a partial enlarged view of FIG. 2A.

DETAILED DESCRIPTION OF THE INVENTION

Figure 1A:
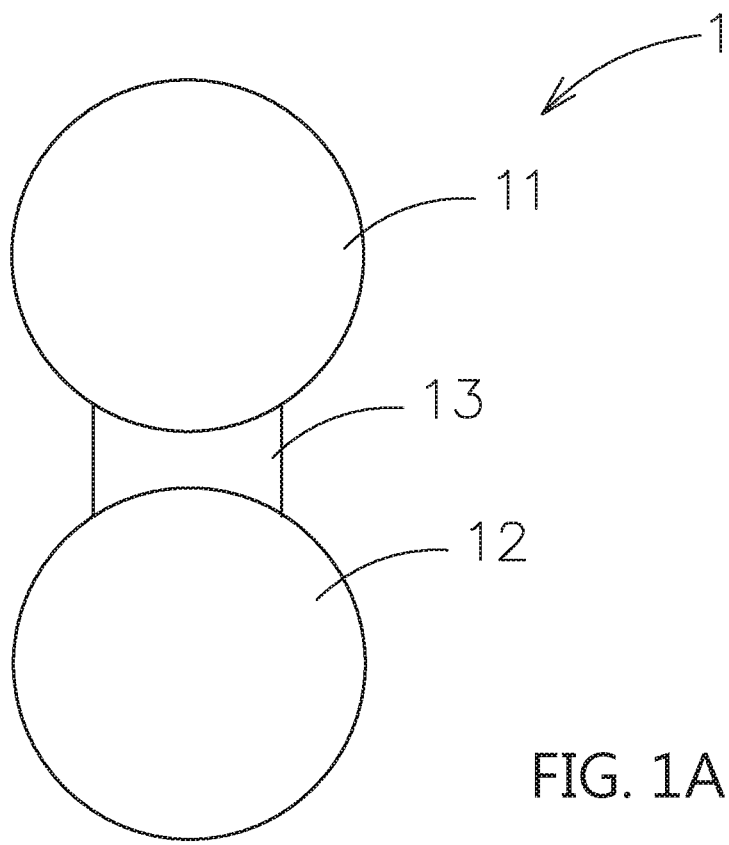
FIG. 1A is a schematic diagram of the passive ceramic particles and the ion-conductive material of the ceramic separator according to this invention.

The present invention will be described with respect to particular embodiments and with reference to certain drawings but the invention is not limited thereto but only by the claims Any reference signs in the claims shall not be construed as limiting the scope. The drawings described are only schematic and are non-limiting. In the drawings, the size of some of the elements may be exaggerated and not drawn on scale for illustrative purposes.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise. Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the description of the present invention, it should be noted that the terms "installation", "connected", and "disposed" are to be understood broadly, for example, can be mechanical or electrical, can be connected directly or indirectly, through an intermediate medium, which can be the internal connection between two components. The specific meanings of the above terms in the present invention can be understood in the specific circumstances by those skilled in the art.

Firstly, the ceramic separator of this invention is adapted for an electrochemical system to separate a positive electrode and a negative electrode to prevent physical contact therebetween. The ceramic separator mainly includes a plurality of passive ceramic particles and an ion-conductive material located between the passive ceramic particles. The mass content of the passive ceramic particles is greater than 40% of the total mass of the ceramic separator. The ion-conductive material is mainly composed of a polymer base material which is capable of allowing metal ions, such as lithium ions, to move inside the material, an additive, which is capable of dissociating metal salts, such as lithium salts, and serves as a plasticizer, and an ion supplying material. The ceramic separator of the present invention is characterized in that the ion-conductive material is used for ion transfer. The passive ceramic particles, which the mass content is greater than 40% of the total mass of the ceramic separator, are acted as the main structural support body of the ceramic separator. Therefore, the high-temperature stability and the high-temperature electrical insulation are achieved. Also, the ion-conductive material further includes a crystal growth inhibiting material to make the primary lattice state of the ion-conductive material be amorphous state to facilitate ion transfer.

The structure formed by the stacking of the passive ceramic particles is defined as the "structural support body" in this invention. The ceramic particles are a relatively rigid portions compared with other compositions of the ceramic separator, such as ion-conductive material. Therefore, the length, width and height of the ceramic separator are mainly supported or constructed by the ceramic particles.

The aforementioned polymer base material that allows metal ions, such as lithium ions, to move inside the material refers to a material that does not have metal ions, such as lithium ions, by itself (in the state of raw materials or at the beginning of the electrochemical reaction), but can transfer metal ions, such as lithium ions. For example, the polymer base material may be a linear structural material without containing salts, such as a polyethylene oxide (PEO), or the PEO already containing salts, the ions supplying material, such as $PEO-LiCF_3SO_3$, $PEO-LiTFSI-Al_2O_3$ composite solid polymer, $PEO-LiTFSI-10\%$ $TiO_2$ composite solid polymer, PEO-LiTFSI-10% HNT composite solid polymer, PEO-LiTFSI-10% MMT composite solid polymer, PEO-LiTFSI-1% LGPS composite solid polymer or $PEO-LiClO_4$-LAGP. Or in addition to be able to transfer metal ions, such as lithium ions, it is also a material that can increase the mechanical strength of the film-forming due to its cross-linked structure, such as a poly(ethylene glycol)diacrylate (PEGDA), a poly(ethylene glycol)dimethacrylate (PEGDMA), a poly(ethylene glycol) monomethylether (PEGME), a poly(ethylene glycol) dimethylether (PEGDME), a poly[ethylene oxide-co-2-(2-methoxyethoxy) ethyl glycidyl ether] (PEO/MEEGE), a hyperbranched polymer, such as a poly[bis(triethylene glycol)benzoate], or a polynitrile, such as a polyacrylonitrile (PAN), a poly(methacrylonitrile) (PMAN) or a poly(N-2-cyanoethyl)ethyleneamine) (PCEEI).

The crystal growth inhibiting material is selected from the material for decreasing in crystallinity, such as a poly(ethyl methacrylate) (PEMA), a poly(methyl methacrylate) (PMMA), a poly(oxyethylene), a poly (cyanoacrylate) (PCA), a polyethylene glycol (PEG), a poly(vinyl alcohol) (PVA), a polyvinyl butyral (PVB), a poly(vinyl chloride) (PVC), a PVC-PEMA, a PEO-PMMA, a poly(acrylonitrile-co-methyl methacrylate) P(AN-co-MMA), a PVA-PVdF, a PAN-PVA, a PVC-PEMA, a polycarbonates, such as a poly(ethylene oxide-co-ethylene carbonate) (PEOEC), a polyhedral oligomeric silsesquioxane (POSS), a polyethylene carbonate (PEC), a poly (propylene carbonate) (PPC), a poly(ethyl glycidyl ether carbonate) (P(Et-GEC), or a poly (t-butyl glycidyl ether carbonate) P(tBu-GEC), a cyclic carbonates, such as a poly (trimethylene carbonate) (PTMC), a polysiloxane-based, such as a polydimethylsiloxane (PDMS), a poly(dimethyl siloxane-co-ethylene oxide) P(DMS-co-EO), or a poly(siloxane-g-ethyleneoxide), a polyesters, such as an ethylene adipate, an ethylene succinate, or an ethylene malonate. Further, the crystal growth inhibiting material may be a poly(vinylidenedifluoridehexafluoropropylene) (PvdF-HFP), a poly(vinylidenedifluoride) (PvdF), or a poly(ε-caprolactone) (PCL).

The additive, which is capable of dissociating metal salts, such as lithium salts, and is served as a plasticizer, may be selected from a plastic crystal electrolytes (PCEs), such as a Succinonitrile (SN) [ETPTA/SN; PEO/SN; PAN/PVA-CN/SN], a N-ethyl-N-methylpyrrolidinium, [C2mpyr]+Anions N,N-diethyl-pyrrolidinium,[C2Epyr], a quaternary alkylammonium, a n-alkyltrimethylphosphonium, [P1,1,1,n], a decamethylferro-cenium, [Fe(C5Me5)2], a 1-(N,N-dimethylammonium)-2-(ammonium)ethane triflate ([DMEDAH2][Tf]2), an anions=[FSI], [FSA], [CFSA], [BETA], a LiSi$(CH_3)_3(SO_4)$, or a trimethy(lithium trimethylsilyl sulfate), or an ionic liquid, which may select from an imidazolium, such as an anion/bis(trifluoromethanesulfonyl)imide, an anion/bis (fluorosulfonyl)imide, or an anion/trifluoromethanesulfonate, or an ammonium, such as an anion/bis(trifluoromethanesulfonyl)imide, or a pyrrolidinium, such as an anion/Bis(trifluoromethanesulfonyl)imide, an anion/bis (fluorosulfonyl)imide, or a piperidinium, such as an anion/bis(trifluoromethanesulfonyl)imide, an anion/bis(fluorosulfonyl)imide.

The ion supplying material may be a lithium salt, such as a LiTFSI, a LiFSI, a $LiBF_4$, or a $LiPF_6$.

Moreover, the ion-conductive material further includes a second dopant with nanometer scale, which is selected from a passive ceramic material, an inorganic solid electrolyte or a combinations thereof. When the second dopant is the passive ceramic material, the amount of the usage of the polymer base materials and the additives can be reduced, and the film-forming ability can also be improved to serve as a film-forming enhancer. The passive ceramic material may be, for example, the silicon dioxide.

Besides, the fluidity of the polymer base material is improved by adding the additive. Thus, the polymer base material would have higher ion conductivity and poorer mechanical properties at room temperature to cover the outer surface of the passive ceramic particles, or fill into the pores at the surfaces of the passive ceramic particles. Moreover, the additive, such as ionic liquids, is non-volatile. There will be no incurred the problems of generating flammable gas. And, the ion-conductive material will not cause size shrinkage and drop of ions conductivity by volatilizing of the added additive during the drying process.

In the following embodiments, the first particle and the second particle are represented the passive ceramic particles and the ion-conductive material of the ceramic separator to demonstrate the relative structure or positions. There is no limit to the amount of the passive ceramic particles of the ceramic separator.

Please refer to FIG. 1A, which shows one embodiment of the passive ceramic particles and the ion-conductive material of the ceramic separator of this invention. As shown, the ceramic separator 1 includes a first particle 11, which is the first passive ceramic particle, a second particle 12, which is the second passive ceramic particle, and a bridging portion 13 is located between the first particle 11 and the second particle 12 and is composed of the ion-conductive material to serve as an ion transmission path. As above-mentioned, the fluidity of the polymer base material is improved by adding the additive, such as the ionic liquid. The polymer base material would have higher ion conductivity and poorer mechanical properties at room temperature to fill between the first particle 11 and the second particle 12. Therefore, the first particle 11 may contact another particle in a way of the surface-to-surface or the approximate impregnation coating type contact by the bridging portion 13.

Figure 1B:
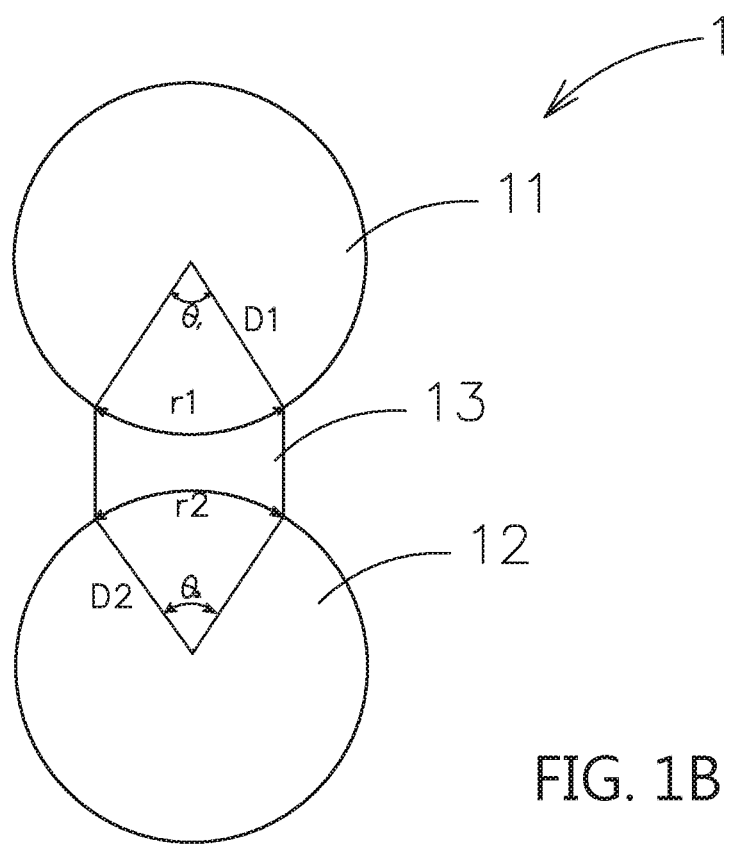
FIG. 1B is a schematic diagram of the contact surface between the bridging portion and the passive ceramic particles according to this invention.

The surface-to-surface or the approximate impregnation coating type contact of the invention is shown in FIG. 1B. For example, the first particle 11 is sphere with radius D1 and the second particle 12 is sphere with radius D2. The contact between the bridging portion 13 and the first particle 11 is the arc length r1 with a central angle θ1. Therefore, the arc length r1 would be 2πD1*θ1/360, 0<θ1<90. The contact between the bridging portion 13 and the second particle 12 is the arc length r2 with a central angle θ2. Therefore, the arc length r2 would be 2πD2*θ2/360, 0<θ2<90. The effective contact lengths of first particle and the second particle 12 are the arc lengths r1, r2.

Excepting for ions transmission, the above polymer base material of the ceramic separator acts as the adhesive and the film former to adhere or contact the first particle 11 and the second particle 12 in the way of the surface-to-surface or the approximate impregnation coating type contact.

Figure 1C:
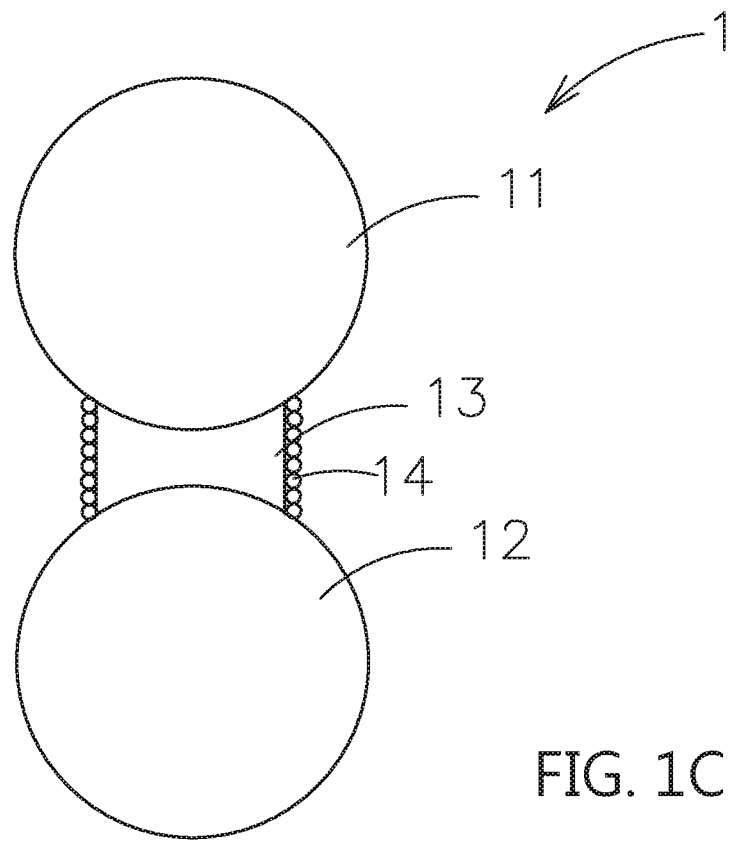
FIGS. 1C-1F are schematic diagrams of the different embodiments of the passive ceramic particles and the ion-conductive material of the ceramic separator according to this invention.
Figure 1D:
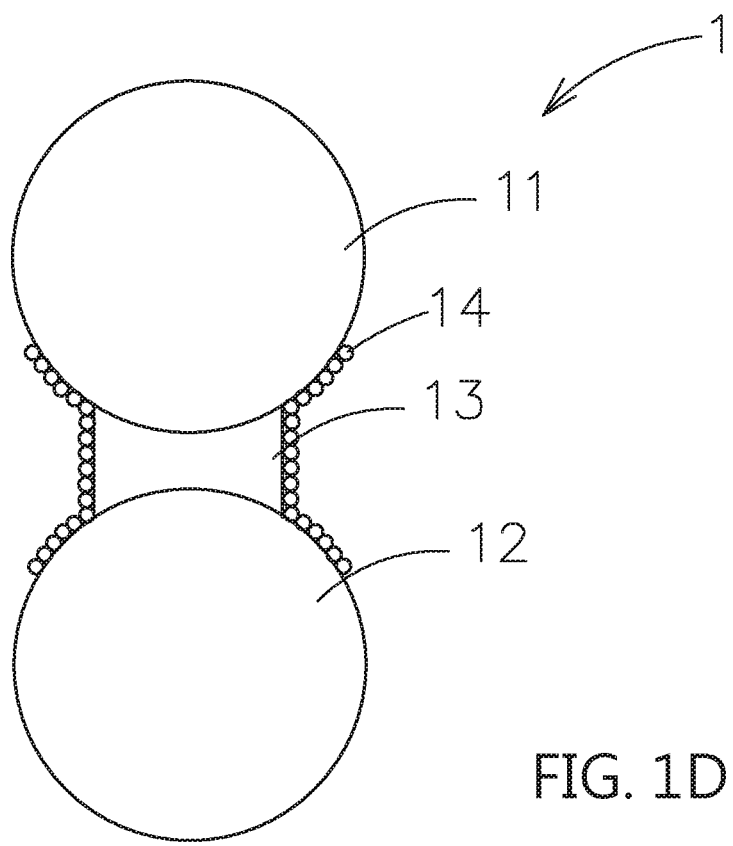

Please refer to FIG. 1C, which shows another embodiment of this invention. As shown, the surfaces of the bridging portion 13, which are not in contact with the first particle 11 and the second particle 12, includes a first dopant 14. The first dopant 14 is selected from a third passive ceramic particle, the inorganic solid electrolyte or a combinations thereof with a size smaller than the size of the first particle 11 and the second particle 12. Further, the first dopant 14 may extend to the outer surfaces of the first particle 11 and the second particle 12, as shown in FIG. 1D. Furthermore, the first dopant 14 may only extend to one of the outer surfaces of the first particle 11 and the second particle 12.

Figure 1E:
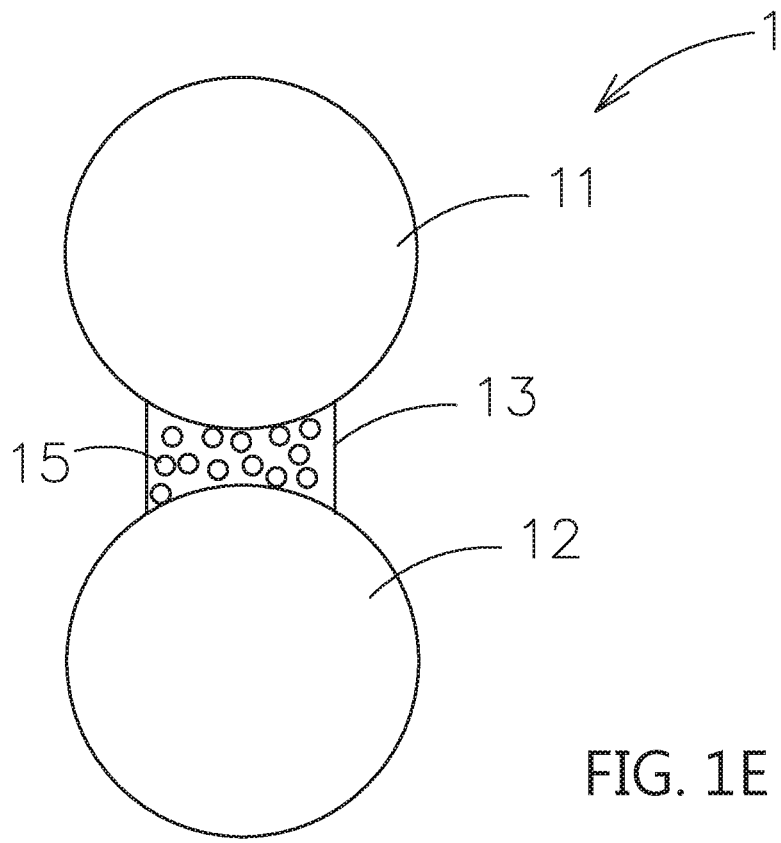

Please refer to FIG. 1E, which shows another embodiment of this invention. As shown, the bridging portion 13 further includes a second dopant 15 with nanometer scale, the second dopant 15 is selected from an inorganic solid electrolyte, a passive ceramic material or a combinations thereof.

Figure 1F:
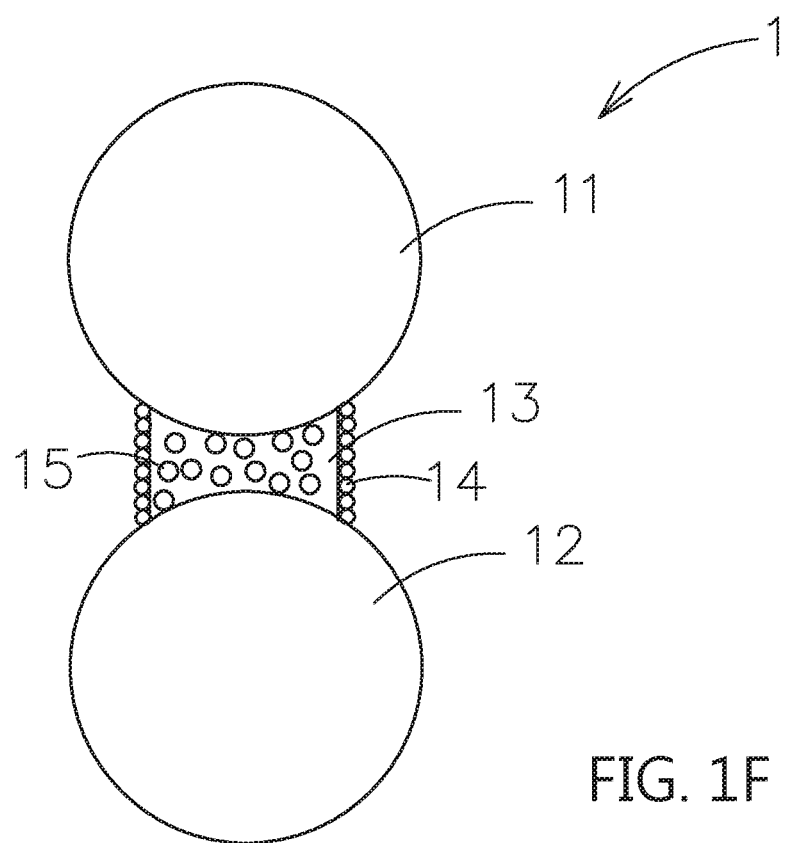

The embodiment in which the second dopant 15 is mixed in the bridging portion 13 can be combined with the above-mentioned embodiment in FIG. 1C or FIG. 1D. For example, please refer to FIG. 1F, the second dopant 15 is mixed in the bridging portion 13 and the surfaces of the bridging portion 13, which are not in contact with the first particle 11 and the second particle 12, includes a first dopant 14.

In the subsequent embodiments, the components with the same structure, material or characteristics will be denoted with the same name and number.

Please refer to FIG. 2A, which shows another embodiment of the passive ceramic particies and the ion-conductive material of the ceramic separator of this invention. As shown, the ceramic separator 2 includes a first particle 11, a second particle 12, and a first shell layer 21, which covers an outer surface of the first particle 11. The first shell layer 21 composed of the ion-conductive material is used to adhere the first particle 11 and the second particle 12. As shown in FIG. 2G which is a partial enlarged view of FIG. 2A, based on the ion-conductive material has poorer mechanical property, the adhered place of the second particle 12 and the first shell layer 21 is performed in the surface-to-surface or the approximate impregnation coating type contact way instated of point to point contact way. In the subsequent description, the components formed by the ion-conductive material will be the same impregnation coating type contact when touching to another substance (particle) with hard surface or fixed-shaped appearance.

Figure 2C:
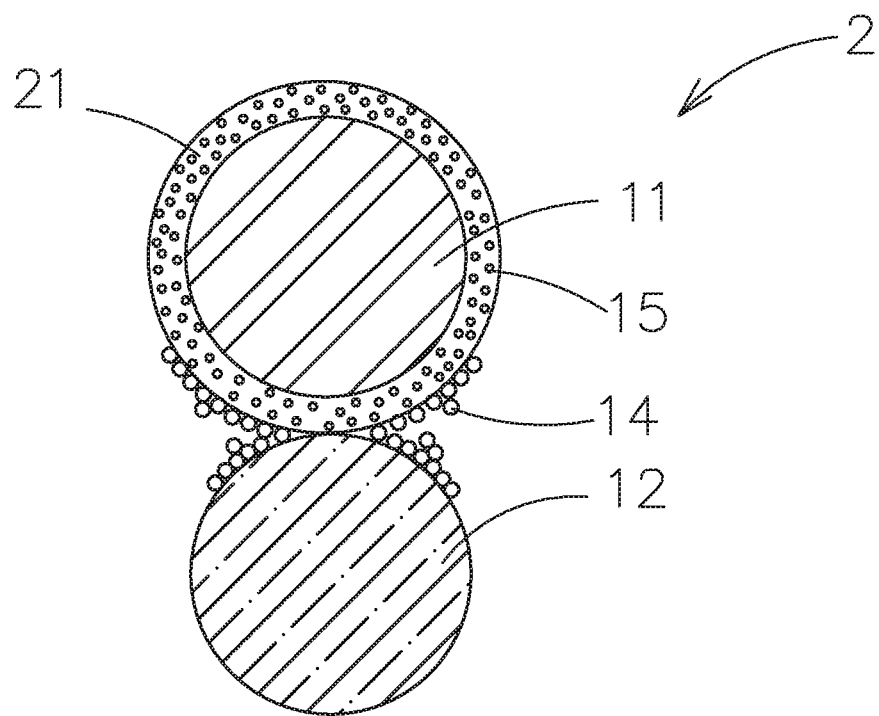

Please refer to FIG. 2B, comparing to the embodiment in FIG. 2A, the first dopant 14 is included in the outer surface of the first shell layer 21, and further extended to the outer surface of the second particle 12. Please refer to FIG. 2C, comparing to the embodiment in FIG. 2B, the second dopant 15 is mixed in the first shell layer 21. Please refer to FIG. 2D, a second shell layer 22 may be formed on the outer surface of the second particle 12. The second shell layer 22 is also composed of the ion-conductive material.

Figure 2D:
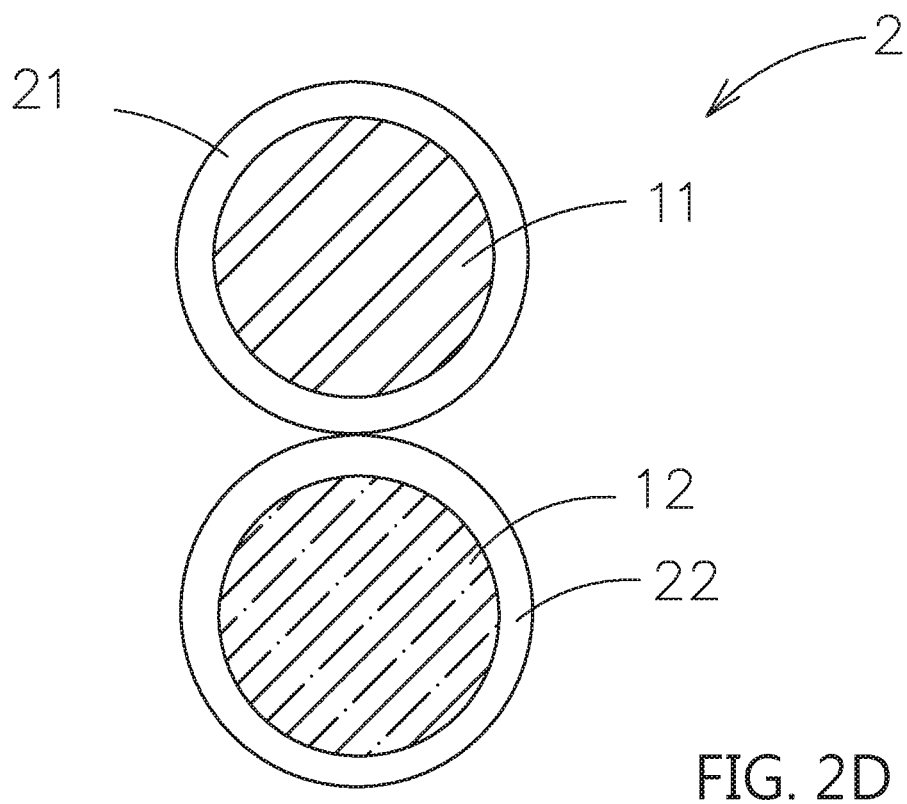
Figure 2E:
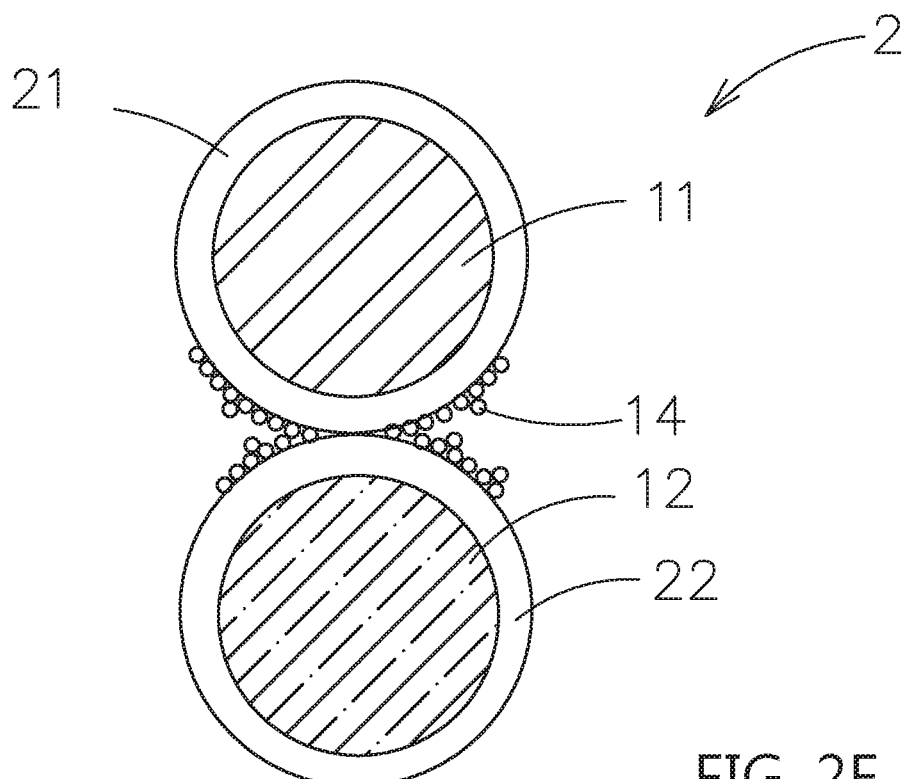
Figure 2F:
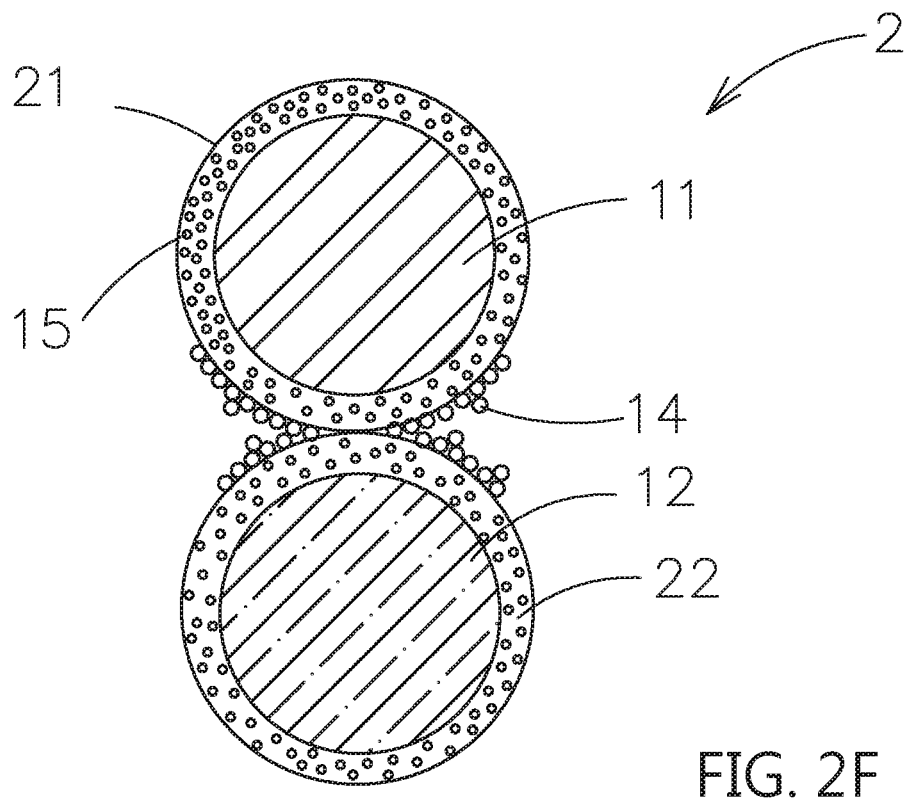

Please refer to FIG. 2E, comparing to the embodiment in FIG. 2D, the first dopant 14 is included in the outer surface of the first shell layer 21 and the second shell layer 22. Besides, the first dopant 14 may only be included in one of the outer surface of the first shell layer 21 and the second shell layer 22. Please refer to FIG. 2F, comparing to the embodiment in FIG. 2E, the second dopant 15 is mixed in the first shell layer 21 and the second shell layer 22. Moreover, the second dopant 15 may be mixed in the first shell layer 21 or the second shell layer 22.

Figure 3A:
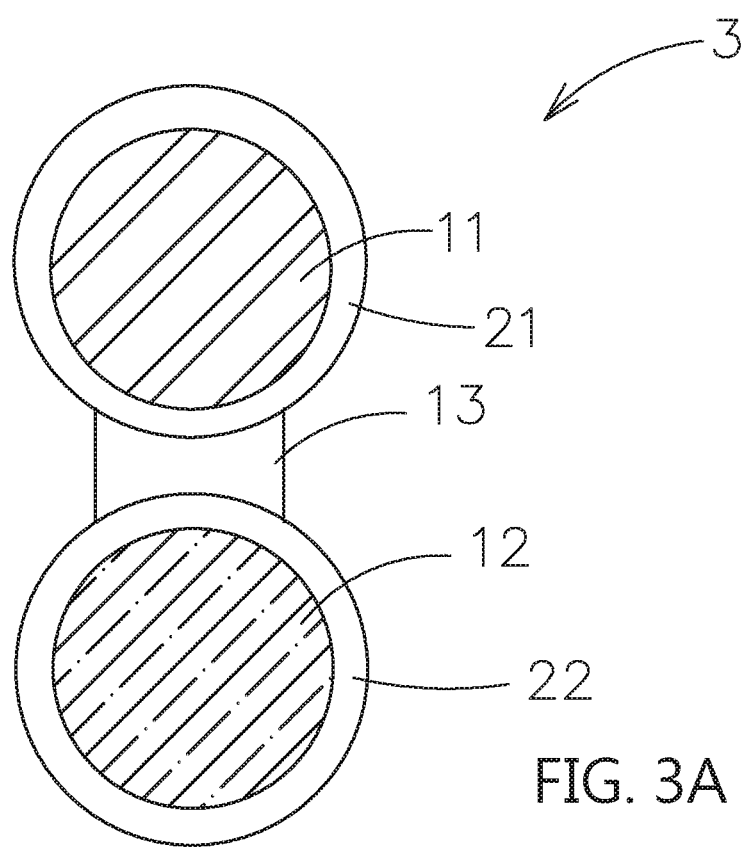
FIGS. 3A-3E are schematic diagrams of the different embodiments of the passive ceramic particles and the ion-conductive material of the ceramic separator according to this invention.

Please refer to FIG. 3A, which shows another embodiment of the passive ceramic particles and the ion-conductive material of the ceramic separator of this invention. As shown, the ceramic separator 3 includes a first particle 11, a second particle 12, a first shell layer 21, which covers an outer surface of the first particle 11, a second shell layer 22, which covers an outer surface of the second particle 12, and a bridging portion 13, which is located between the first shell layer 21 and the second shell layer 22 and connected or adhered therebetween. The first shell layer 21, the second shell layer 22 and the bridging portion 13 are composed of the ion-conductive material.

Figure 3B:
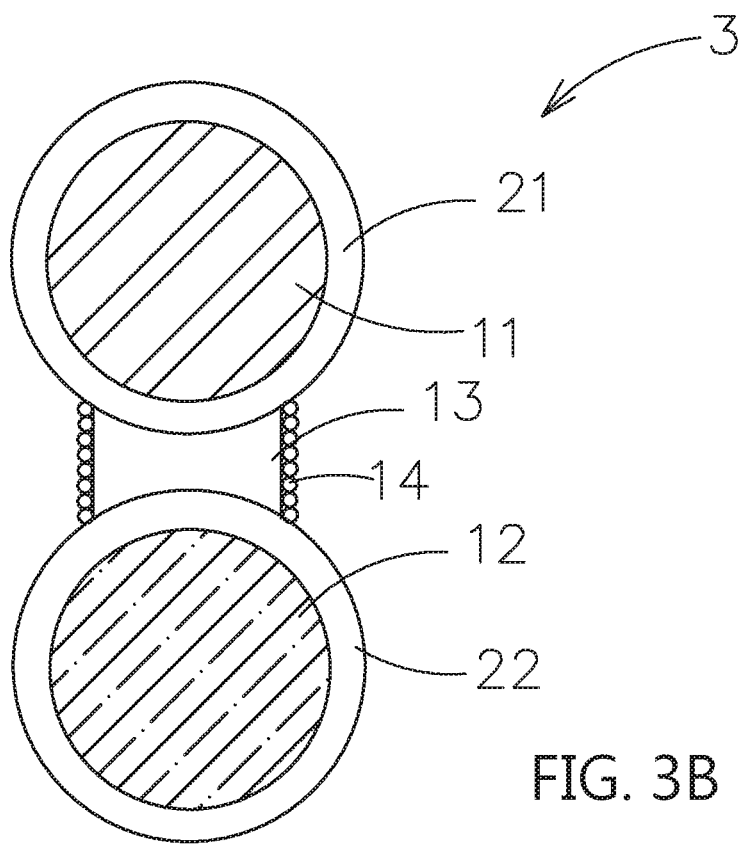
Figure 3C:
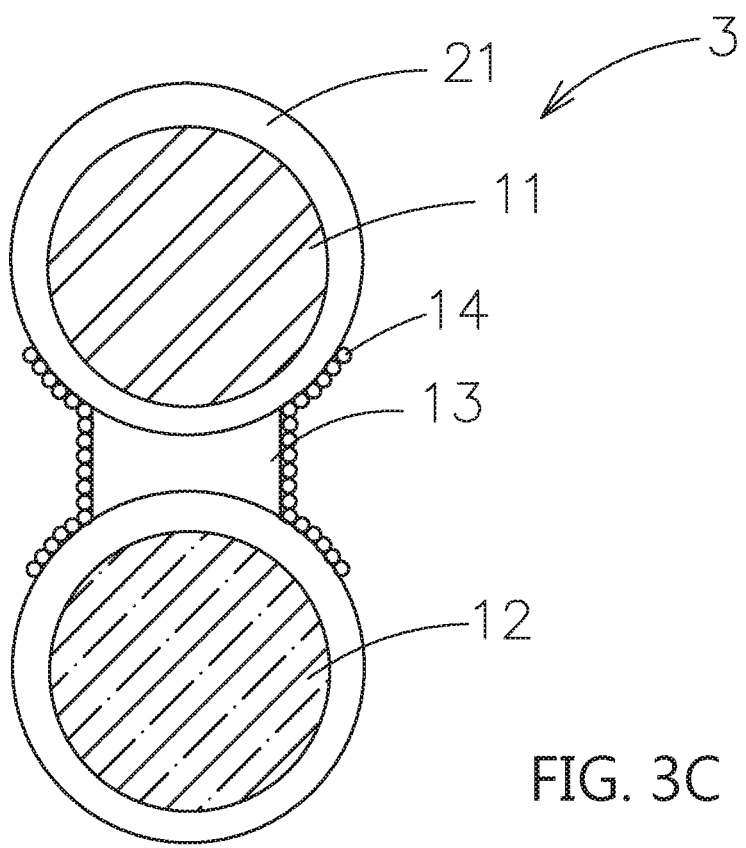

Please refer to FIG. 3B, comparing to the embodiment in FIG. 3A, the first dopant 14 is included in the surfaces of the bridging portion 13, which are not in contact with the first shell layer 21 and the second shell layer 22. Please refer to FIG. 3C, comparing to the embodiment in FIG. 3B, the first dopant 14 is further extended to the outer surfaces of the first shell layer 21 and the second shell layer 22. Besides, the first dopant 14 may be further extended to one of the outer surfaces of the first shell layer 21 and the second shell layer 22.

Figure 3D:
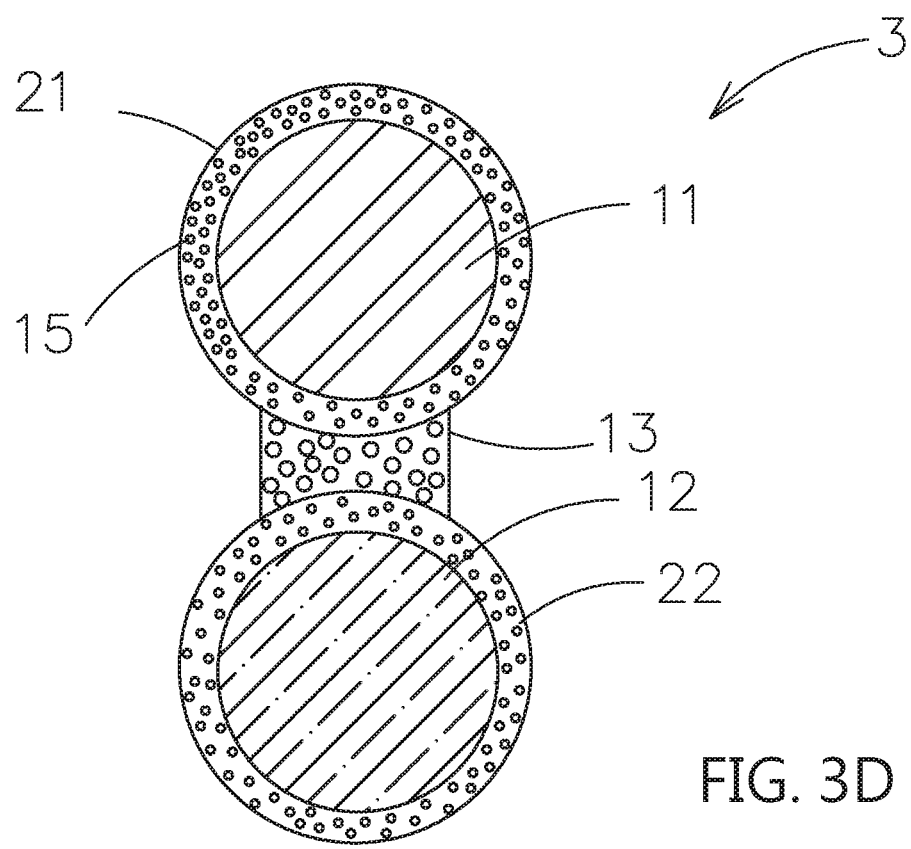

Please refer to FIG. 3D, comparing to the embodiment in FIG. 3C, the second dopant 15 is mixed in the first shell layer 21, the second shell layer 22 and the bridging portion 13.

Figure 3E:
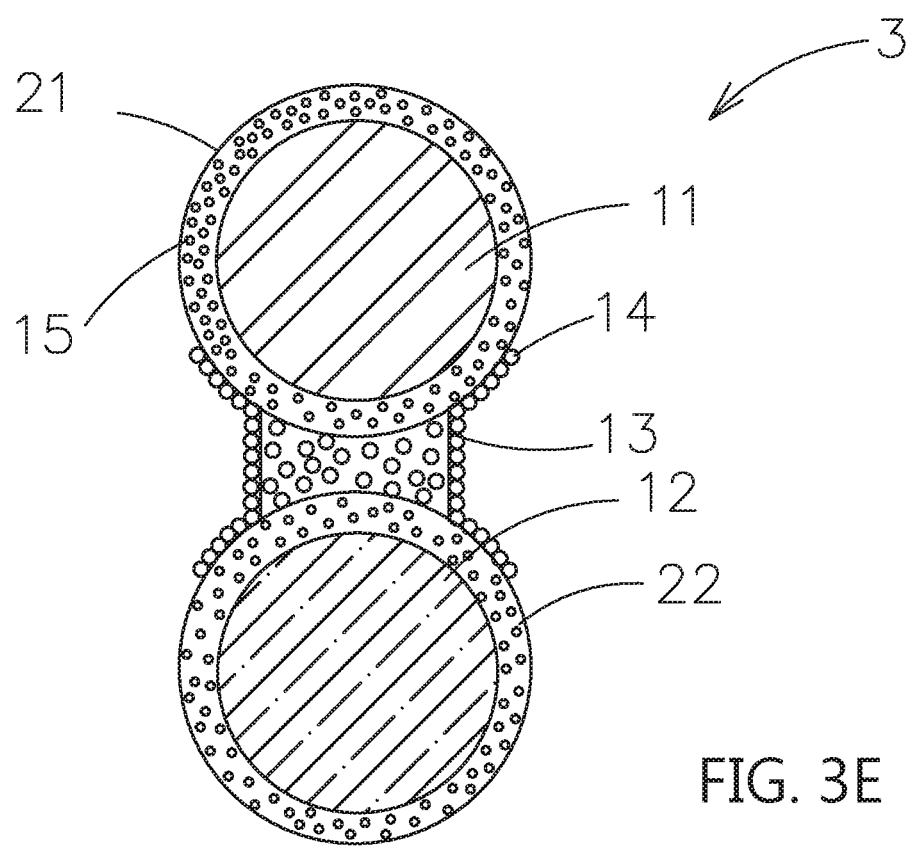

Please refer to FIG. 3E, comparing to the embodiment in FIG. 3D, the first dopant 14 is further extended to the outer surfaces of the first shell layer 21, the bridging portion 13 and the second shell layer 22.

The first dopant 14 and the second dopant 15 of the present invention are the passive ceramic particles having the particle size, which is smaller than the sizes of the first particle 11 and the second particle 12. The amount of the usage of the ion-conductive material can be reduced, and can serve as a film-forming enhancer.

The first particle 11 and the second particle 12 may be the same or different materials, and the first dopant 14 and the second dopant 15 may be the same or different materials.

Accordingly, the present invention provides a ceramic separator, which mainly includes a plurality of passive ceramic particles and an ion-conductive material located between the passive ceramic particles. The mass content of the passive ceramic particles is greater than 40% of the total mass of the ceramic separator. The ion-conductive material is mainly composed of a polymer base material which is capable of allowing metal ions to move inside the material, an additive, which is capable of dissociating metal salts and is served as a plasticizer, and an ions supplying material. The ceramic separator of the present invention has high-temperature stability and high-temperature electrical insulation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A ceramic separator, adapted to separate a positive electrode and a negative electrode of an electrochemical system, the ceramic separator comprising:
a plurality of passive ceramic particles; and
an ion-conductive material, located between the passive ceramic particles, the ion-conductive material including:
a polymer base material, being capable of allowing metal ions to move inside;
an additive, being capable of dissociating metal salts and serving as a plasticizer; and
an ion supplying material;
wherein the passive ceramic particles are present in an amount of more than 40 percent of the total mass;
wherein the passive ceramic particles include a first particle and a second particle being adjacent to the first particle, and the ion-conductive material is located on an outer surface of the first particle to form a first shell layer;
wherein the ion-conductive material is further located on an outer surface of the second particle to form a second shell layer to contact with the first shell layer; and
wherein outer surfaces of the first shell layer and the second shell layer include a first dopant, wherein a size of the first dopant is smaller than a size of the passive ceramic particles.

2. The ceramic separator of claim 1, wherein the ion-conductive material further comprises a crystal growth inhibiting material.

3. The ceramic separator of claim 1, wherein the ion supplying material is a lithium salt.

4. The ceramic separator of claim 1, wherein the ion-conductive material further comprises a second dopant with nanometer scale, which is selected from a passive ceramic material, an inorganic solid electrolyte or a combinations thereof.

5. The ceramic separator of claim 1, wherein the polymer base material is selected from a polyethylene oxide (PEO), a poly(ethylene glycol)diacrylate (PEGDA), a poly(ethylene glycol)dimethacrylate (PEGDMA), a poly(ethylene glycol) monomethylether (PEGME), a poly(ethylene glycol) dimethylether (PEGDME), a poly[ethylene oxide-co-2-(2-methoxyethoxy)ethyl glycidyl ether] (PEO/MEEGE), a hyperbranched polymer, or a polynitrile.

6. The ceramic separator of claim 1, wherein the additive is a plastic crystal electrolytes (PCEs) or an ionic liquid.

7. The ceramic separator of claim 1, wherein the first dopant is selected from a passive ceramic material, an inorganic solid electrolyte or a combination thereof.

8. A ceramic separator, adapted to separate a positive electrode and a negative electrode of an electrochemical system, the ceramic separator comprising:
a plurality of passive ceramic particles; and
an ion-conductive material, located between the passive ceramic particles and the ion-conductive material including:
a polymer base material, being capable of allowing metal ions to move inside;
an additive, being capable of dissociating metal salts and serving as a plasticizer; and
an ion supplying material;
wherein the passive ceramic particles are present in an amount of more than 40 percent of the total mass;
wherein the passive ceramic particles include a first particle and a second particle, and the ion-conductive material is located between the first particle and the second particle to form a bridging portion to adhere the first particle and the second particle, and
wherein a surface of the bridging portion, which is not in contact with the first particle and the second particle, includes a first dopant, wherein a size of the first dopant is smaller than a size of the passive ceramic particles.

9. The ceramic separator of claim 8, wherein the first dopant is further extended to the outer surfaces of the first particle and the second particle.

10. The ceramic separator of claim 8, wherein the first dopant is selected from a passive ceramic material, an inorganic solid electrolyte or a combinations thereof.

11. The ceramic separator of claim 8, wherein the ion-conductive material further comprises a crystal growth inhibiting material.

12. The ceramic separator of claim 8, wherein the ion supplying material is a lithium salt.

13. The ceramic separator of claim 8, wherein the ion-conductive material further comprises a second dopant with nanometer scale, which is selected from a passive ceramic material, an inorganic solid electrolyte or a combination thereof.

14. The ceramic separator of claim 8, wherein the polymer base material is selected from a polyethylene oxide (PEO), a poly(ethylene glycol)diacrylate (PEGDA), a poly(ethylene glycol)dimethacrylate (PEGDMA), a poly(ethylene glycol) monomethylether (PEGME), a poly(ethylene glycol) dimethylether (PEGDME), a poly[ethylene oxide-co-2-(2-methoxyethoxy)ethyl glycidyl ether] (PEO/MEEGE), a hyperbranched polymer, or a polynitrile.

15. The ceramic separator of claim 8, wherein the additive is a plastic crystal electrolytes (PCEs) or an ionic liquid.

16. A ceramic separator, adapted to separate a positive electrode and a negative electrode of an electrochemical system, the ceramic separator comprising:
a plurality of passive ceramic particles; and
an ion-conductive material, located between the passive ceramic particles and the ion-conductive material including:
a polymer base material, being capable of allowing metal ions to move inside;
an additive, being capable of dissociating metal salts and serving as a plasticizer; and
an ion supplying material;
wherein the passive ceramic particles are present in an amount of more than 40 percent of the total mass;
wherein the passive ceramic particles include a first particle and a second particle being adjacent to the first particle, and the ion-conductive material is located on an outer surface of the first particle to form a first shell layer;
wherein the ion-conductive material is further located on an outer surface of the second particle to form a second shell layer to contact with the first shell layer;
wherein the ion-conductive material forms a bridging portion between the first shell layer and the second shell layer; and
wherein a surface of the bridging portion, which is not in contact with the first particle and the second particle, includes a first dopant, wherein a size of the first dopant is smaller than a size of the passive ceramic particles.

17. The ceramic separator of claim 16, wherein the first dopant is further extended to the outer surfaces of the first particle and the second particle.

18. The ceramic separator of claim 16, wherein the first dopant is selected from a passive ceramic material, an inorganic solid electrolyte or a combinations thereof.

19. The ceramic separator of claim 16, wherein the ion-conductive material further comprises a crystal growth inhibiting material.

20. The ceramic separator of claim 16, wherein the ion supplying material is a lithium salt.

21. The ceramic separator of claim 16, wherein the ion-conductive material further comprises a second dopant with nanometer scale, which is selected from a passive ceramic material, an inorganic solid electrolyte or a combination thereof.

22. The ceramic separator of claim 16, wherein the polymer base material is selected from a polyethylene oxide (PEO), a poly(ethylene glycol)diacrylate (PEGDA), a poly (ethylene glycol)dimethacrylate (PEGDMA), a poly(ethylene glycol) monomethylether (PEGME), a poly(ethylene glycol) dimethylether (PEGDME), a poly[ethylene oxide-co-2-(2-methoxyethoxy)ethyl glycidyl ether] (PEO/MEEGE), a hyperbranched polymer, or a polynitrile.

23. The ceramic separator of claim 16, wherein the additive is a plastic crystal electrolytes (PCEs) or an ionic liquid.

* * * * *